United States Patent [19]

Scown

[11] Patent Number: 4,893,324

[45] Date of Patent: Jan. 9, 1990

[54] PORTABLE FIRE DETECTION SYSTEM

[76] Inventor: Kenneth M. Scown, 2603 Laramie Gate Cir., Pleasanton, Calif. 94566

[21] Appl. No.: 311,645

[22] Filed: Feb. 16, 1989

[51] Int. Cl.⁴ .................... H04M 11/04; G08B 17/12
[52] U.S. Cl. ...................................... 379/40; 379/43; 379/42; 340/506; 340/521; 340/533
[58] Field of Search ................................... 379/39–43; 340/506, 521, 533

[56] References Cited

U.S. PATENT DOCUMENTS 4,017,852 4/1977 Kabat .................................. 340/533
4,521,645 6/1985 Carroll ................................. 379/42

Primary Examiner—Jin F. Ng
Assistant Examiner—Wing F. Chan
Attorney, Agent, or Firm—Linval B. Castle

[57] ABSTRACT

A portable fire detector and alarm system includes a rechargeable battery power supply and circuitry that monitors a string of up to forty smoke detectors and signals a telephone auto-dialer and prerecorded message unit whenever an alarm occurs. The distal end of the detector line is fed back to the monitor which then detects any loss of continuity in the lines or input AC power and then signals a trouble signal through the auto-dialer.

1 Claim, 2 Drawing Sheets

PORTABLE FIRE DETECTION SYSTEM

BRIEF SUMMARY OF THE INVENTION

This invention relates to fire detection and in particular to a novel portable detection system which not only signals the existence of a fire but also provides a different alarm signal in the event of power failures or a discontinuity through any of up to forty sensor circuits.

Safety laws in many cities require that hotels and other buildings open to the public must be equipped with smoke detection systems. Also all factories, particularly those employing incendiary substances, must be alerted by detection systems. Unfortunately, fire detection systems suffer s loss of efficiency with age and must be reconditioned, replaced and occasionally redesigned to accommodate various changes, additions or reconstruction of a building. It is during those periods of the permanent system shut-down, or during periods of new construction that an efficient temporary and portable detection system must be installed.

The portable fire detection system to be described includes a small lightweight AC/battery power supply and circuit monitor unit which may be connected to a string of up to about forty ionization type smoke detectors. The monitor unit will produce an alarm output signal to a telephone auto-dialer and prerecorded message playback unit upon sensing an alarm signal from a smoke alarm, and also monitors various connections in the smoke alarm circuitry and will produce a "trouble" signal to the auto-dialer upon failure of the AC power or if any of the four-wire smoke alarm circuit is open and inoperative. The auto dialer may therefore contact a predesignated fire control unit in the event of an alarm signal or may contact predesignated maintenance people in the event of a trouble output signal.

BRIEF DESCRIPTION OF THE DRAWING

In the drawings which illustrate the preferred embodiment of the invention.

DETAILED DESCRIPTION

Figure 1:
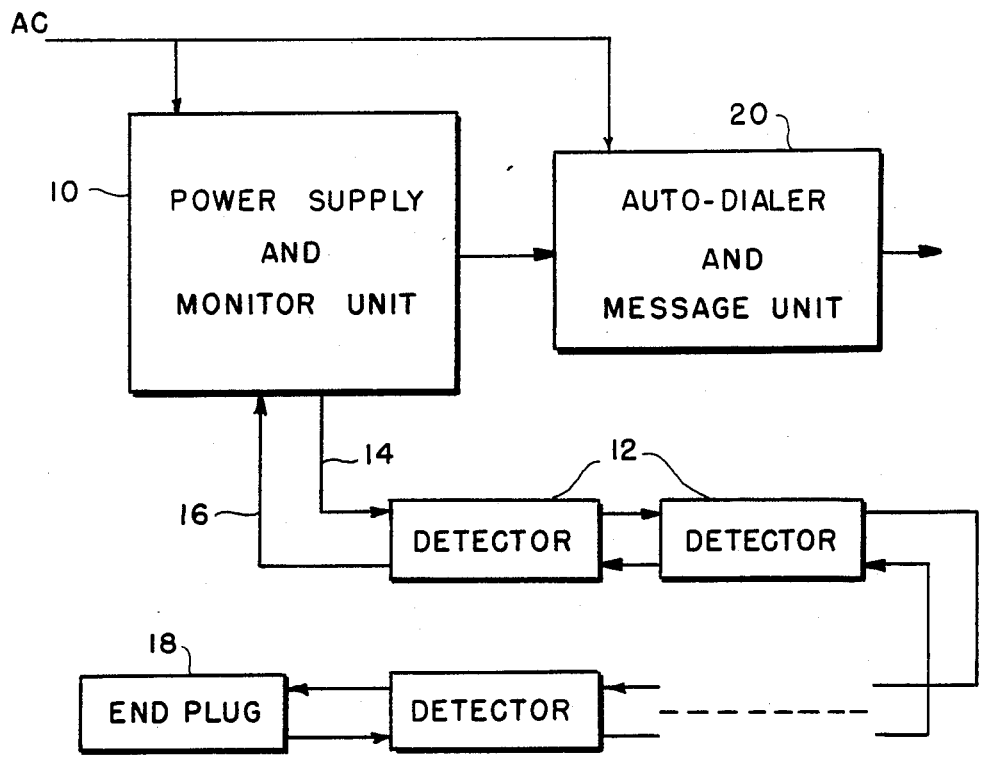
FIG. 1 is block diagram of portable fire detection system.

FIG. 1 is a block diagram of the portable fire detection system which includes an AC powered power supply and monitor unit 10 which has an internal rechargeable battery power standby. The unit 10 powers and monitors a string of ionization type smoke detectors 12 coupled in parallel through power and alarm leads 14, and detects any breaks in the detector circuitry through supervisory leads 16. Individual smoke detector units may be connected in series into the circuitry as required, each unit being coupled in parallel across the power leads and the alarm leads. At the end of the string of detectors, the power and alarm leads 14 are coupled through an end plug 18 to the supervisory leads 16 which return to the monitor unit 10.

The monitor unit constantly checks continuity through the power supply leads and each of the alarm leads from all smoke detectors and, if any break is detected or if the AC power is off and the system is powered only by the standby battery, the monitor produces a signal to an auto dialer and message playback unit 20 that will dial a preselected telephone number and transmit a voice recorded message of the trouble. Even if the AC power is off and the detector is operating on battery power, the monitor 10 monitors the detector smoke alarms 12 and, if any become activated because of the presence of smoke, the monitor senses this and produces an alarm signal to the auto dialer 20 which transmits the alarm to one or more different preselected telephone numbers.

Figure 2:
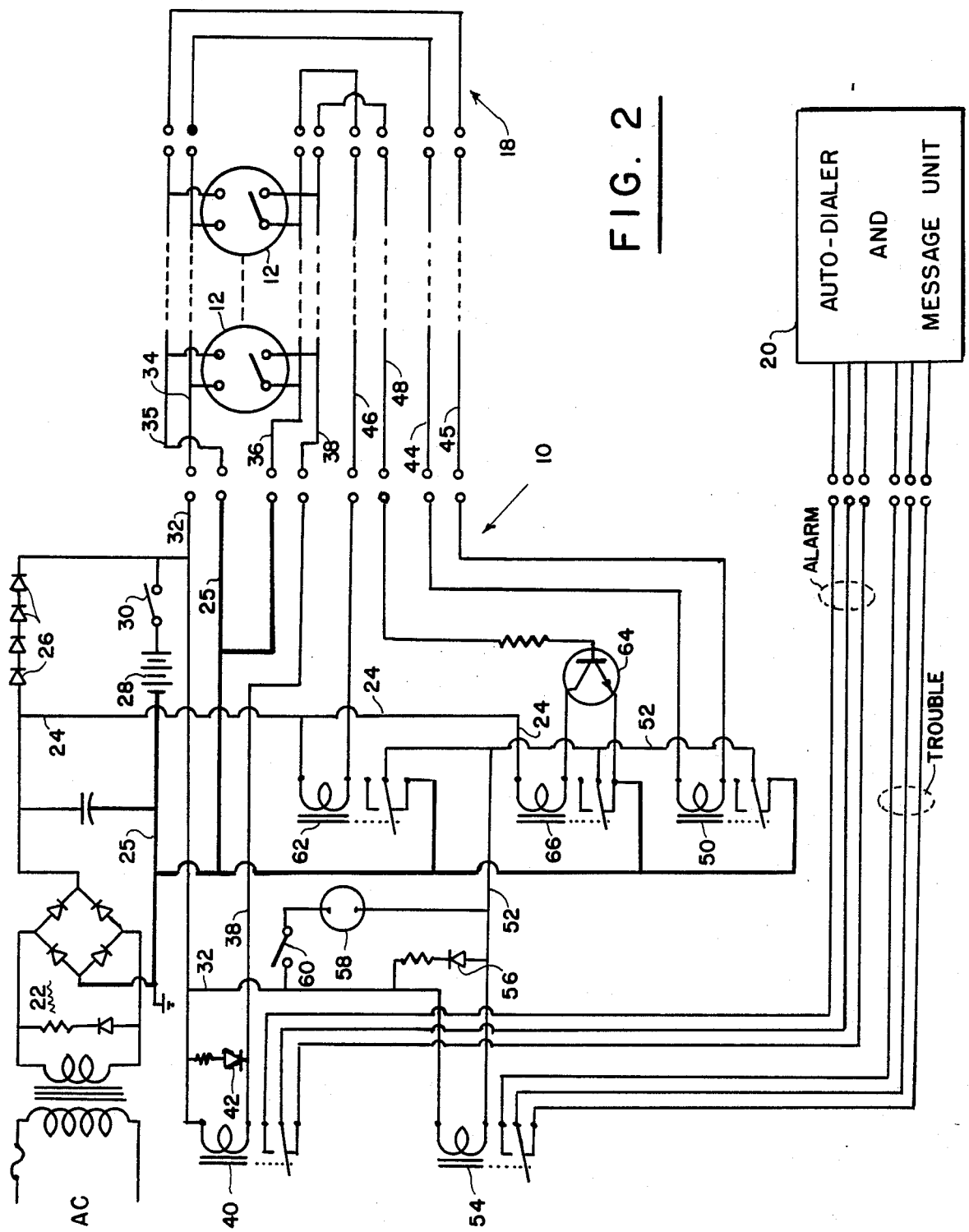
FIG. 2 is a schematic diagram of the detection system.

FIG. 2 is a circuit diagram of the monitor 10, with smoke alarms 12 and end plug 18. The auto dialer 20 is commercially available, such as a battery operated Tandy 49-341, and is shown only in block form in FIG. 2.

The monitor 10 includes a conventional bridge rectifier circuit 22 which converts the AC input voltage to a DC level between a positive conductor 24 and a negative conductor 25. The positive DC level is dropped by four series silicon diodes to approximately 13.6 volts to charge a 12 volt Gel Cel battery 28 through a single pole switch 30 and also to provide power to smoke detectors through the conductor 32. The switch 30 may be open during periods of storage or shipping of the system but is closed during operation to apply battery power to the detectors.

The smoke detectors 12 are coupled to the monitor 10 through a connector, each detector being coupled to an adjacent detector 12 by a cable connector so that the entire detection system may have a series string of as many as thirty or forty individual detectors 12 each connected in parallel with adjacent detectors. Thus, the conductors 34 and 35 in the smoke detector circuitry are respectively coupled to monitor conductors 32 and 25 to provide battery power to all smoke detectors 12. The detectors are preferably the ionization type detectors such as the those marketed under the name, Safe House #49-481 and close a switch circuit within the detector when a predetermined smoke level is sensed. The two detector switch contacts are connected to conductors 36 and 38 which, as with the conductors 34 and 35, are connected to all smoke detectors in the system. The conductors 34, 35, 36 and 38 are shown as the power and alarm leads 14 in FIG. 1.

The conductors 36, 38 in the smoke detector circuitry are connected to the monitor 10 where conductor 36 is coupled to conductor 25 and becomes a negative battery, or ground connection. Conductor 38 is connected to one side of the coil of alarm relay 40, the other side of which is connected to positive battery on conductor 32. If the detector switch becomes closed in any smoke detector that is powered by battery power through the conductors 34, 35 and is coupled to the alarm conductors 36 and 38, the conductor 38 goes to negative battery potential and the full battery potential is applied across the coil of relay 40 to activate the contacts from a normally open position to a closed position. A small light emitting diode 42 (LED) with series 2.2 kilohm resistance in parallel with the coil of relay 40 will indicate the existence of an alarm condition and the auto-dialer and message unit 20 coupled to respond to the closing of the relay contacts will dial a preselected telephone number and transmit a prerecorded signal of the alarm condition.

Reliability is of prime importance in any alarm system. An alarm system is worthless if it cannot signal the existence of trouble when AC or standby power fails, or if any connector or conductor is inadvertently broken so that a problem cannot be detected and suitable alarms transmitted.

In the present system, the existence of battery power to the smoke detector conductors 34, 35 as well as continuity through these conductors is sensed by the addition of the end plug 18 which merely passes the ends of these conductors around and back into the conductors 44 and 45 in the detector circuitry. These conductors enter the monitor 10 and are applied to the coil of a power supervisory relay 50 which, in its normal de-energized condition, connects its contacts between negative potential on conductor 25 and a conductor 52.

Conductor 52 is coupled to one, side of the coil of relay 54, the opposite side of relay 54 is at positive battery potential on conductor 32. Thus, conductor 52 is grounded when relay 50 is de-energized, the relay 54 will become energized and its contacts will shift to apply a "trouble" signal into the auto-dialer 20 which dials a preselected phone number and transmits a prerecorded message. When "trouble" relay is thus excited, an LED 56 in parallel with the coil is lighted and a 12 volt buzzer 58 in series with a "silence" switch 60 also in parallel with the relay coil is sounded. However, it is intended that the detector power conductors 34, 35 and the return conductors 44,45 will always carry the voltage appearing across monitor conductors 32 and 25. Hence, the relay 5 will always be in its energized state if there is complete continuity through the detector circuitry, and therefore the trouble relay 54 will not be energized.

The continuity through the detector switch conductors 36, 38 is monitored by the return or supervisory conductors 46, 48, respectively, after having been returned through the detector circuitry by the end plug 18. If continuity exists, the conductor 46 is at the negative potential of the monitor conductor 25 and after returning to the monitor 10 this conductor is applied to one side of the coil of a negative voltage supervisory relay 62 the other side of which is coupled to the positive rectified voltage conductor 24, thus bypassing the battery pack 28. If the AC power is on and if there is continuity through conductors 36 and 46, the relay 62 will be energized and the relay contacts will be lifted from the ground potential of conductor 25. With the movable contact thus removed from ground, the negative ground is removed from the conductor 52 so that the trouble relay 54 remains de-energized. If the AC power is removed from the system, the battery powered detector 12 and the alarm relay 40 will continue to function, but the rectified voltage conductor 24 will no longer carry an excitation voltage to the relay 62 and the relay output conductor 52 will be grounded to energize the trouble relay 54.

The relay 66 performs the same function as the relay 62, but supervises the positive conductor continuity through the monitor and detector conductors 38, the end plug 18, and return conductors 48. In the monitor 10, the coil of alarm relay 40 carries the positive potential of conductor 32 to the conductor 38 providing the switches in all smoke detectors 12 are open. Thus, this positive potential is carried to the supervisory conductor 48 if current continuity exists. This potential is applied through to the base of a switching transistor, such as a type 2N2222. which will then become conductive between emitter and collector to thereby couple the coil of relay 66 between the negative potential conductor 25 and the rectified power conductor 24. Therefore, a loss of positive voltage caused by a break in the coil of the alarm relay 40 or a continuity break in the conductors 38 or 48 will remove the positive voltage from the base of transistor 64 to cause relay 66 to be de-energized and relay 54 to be energized to cause the auto-dialer 20 to transmit a prerecorded trouble message to one or more predesignated telephone numbers.

Having thus described my invention, what I claim is as follows:

1. A portable fire detection and alarm system including a power supply and monitor unit, said detection and alarm system comprising:

a plurality of ionization type smoke detectors having a pair of power input terminals, and a pair of alarm output terminals that are electrically interconnected by the detection of smoke, each pair of input and output terminals being connected to respective pair of conductors having first and second ends, each ends of said respective pair of conductors being coupled to the power supply and monitor unit;

the power supply and monitor unit including:

a power supply providing a first DC power source provided by rectified AC input power and a second DC power source derived from batteries rechargeable from said first power source, said first and second sources having a common ground;

first circuitry coupling said second DC. power source and said common ground to the first ends of said pair of smoke detector power input lead conductors;

second circuitry coupling the first end of a first one of said pair of smoke detector alarm output conductors to said common ground and the first end of a second one of said pair of smoke detector alarm output conductors to one end of the excitation coil of an alarm relay, the second end of the excitation coil of said alarm relay being coupled to said second DC source;

a telephone auto-dialer and message transmitter coupled to the relay contacts of said alarm relay and responsive to the energizing of said alarm relay for transmitting a prerecorded alarm message to a predetermined telephone number;

a first supervisory relay having a coil coupled to the second ends of said pair of said smoke detector power input conductors, the contacts of said relay normally connecting a supervisory conductor to common ground, the excitation of said first supervisory relay coil removing said supervisory conductor from said ground;

second and third supervisory relays each having a first coil end coupled to the second ends of said pair of smoke detector alarm output conductors and a second coil end coupled to said first DC power source, the contacts of said second and third supervisory relays normally connecting said supervisory conductor to common ground; and a trouble signaling relay having its coil coupled between said second DC source and said supervisory conductor, said trouble signaling relay being energized by a loss of AC input power and absence of continuity through the smoke detector power input and output alarm circuit conductors, and said telephone auto-dialer and message transmitter coupled to the contacts of said trouble signaling relay and responsive to the energizing of said trouble signaling relay for transmitting a prerecorded trouble message to a predetermined telephone number.

* * * * *